United States Patent [19]

Korn et al.

[11] Patent Number: 5,334,412
[45] Date of Patent: Aug. 2, 1994

[54] ENAMEL FOR USE ON GLASS AND A METHOD OF USING THE SAME

[75] Inventors: George C. Korn, Coraopolis, Pa.; Robert P. Blonski, North Royalton, Ohio

[73] Assignee: Ferro Corporation, Cleveland, Ohio

[21] Appl. No.: 813,207

[22] Filed: Dec. 23, 1991

[51] Int. Cl.⁵ .............................. B05D 5/12
[52] U.S. Cl. ................... 427/108; 427/122; 427/126.2; 427/126.3; 427/228; 427/287; 427/380; 427/383.5; 427/404; 427/419.2; 427/419.7
[58] Field of Search ........... 427/165, 419.2, 228, 427/419.7, 282, 380, 393.5, 108, 123, 126.2, 126.3, 287, 404

[56] References Cited

U.S. PATENT DOCUMENTS

| | | | |
|---|---|---|---|
| 2,604,410 | 7/1952 | Bryant | 106/48 |
| 3,748,171 | 7/1973 | Peeling, Jr. | 117/129 |
| 3,916,366 | 10/1975 | Jefferson | 338/21 |
| 4,044,173 | 8/1977 | Laurie | 427/126.2 |
| 4,148,761 | 4/1979 | Kazmierowicz | 252/512 |
| 4,234,653 | 11/1980 | Ballard et al. | 428/328 |
| 4,322,316 | 3/1982 | Provance et al. | 252/512 |
| 4,359,536 | 11/1982 | Graff et al. | 501/25 |
| 4,366,094 | 12/1982 | Bushey | 252/512 |
| 4,555,415 | 11/1985 | Mumford et al. | 427/193 |
| 4,596,590 | 6/1986 | Boaz | 65/60.51 |
| 4,645,621 | 2/1987 | Nair | 252/513 |
| 4,684,387 | 8/1987 | Clasen et al. | 65/18.4 |
| 4,684,388 | 8/1987 | Boaz | 65/24 |
| 4,684,389 | 8/1987 | Boaz | 65/24 |
| 4,837,383 | 6/1989 | Andrews | 427/108 |
| 4,959,090 | 9/1990 | Reinherz | 65/60.4 |
| 4,975,301 | 12/1990 | Andrews et al. | 427/126.2 |
| 4,983,196 | 1/1991 | Stotka | 65/24 |
| 5,037,670 | 8/1991 | Kuo et al. | 427/126.2 |
| 5,085,805 | 2/1992 | Ruf | 252/518 |

FOREIGN PATENT DOCUMENTS 2104057A  3/0293  United Kingdom.

OTHER PUBLICATIONS

"Catalytic Coatings Containing Various Metal Powders", George F. Carani, Proceedings of the Porcelain Enamel Institute, Technical Forum, vol. 33, 1971, pp. 122–125.

*Technology of Enamels*, V. V. Vargin, Translated from the Russian and edited by Kenneth Shaw, Hart Publishing Co., New York, 1967, Chapter 18, pp. 275–280.

Ceramic Glazes, Cullen W. Parmalee, Cameron G. Harmon, Third Edition, Cahners Books, Boston, MA. 1973, pp. 474–475.

*Glaze for Special Effects*, Herbert H. Sanders, Watson-Guptill Publications, New York, 1974, pp. 57–58.

Clay and Glazes for the Potter, Daniel Rhodes, Chilton Book Company, New York, Second Edition, 1973, p. 273.

*Primary Examiner*—Janyce Bell
*Attorney, Agent, or Firm*—Rankin, Hudak & Hill

[57] ABSTRACT

The present invention provides a novel enamel composition and a method of using the same to decorate substrates such as a section of glass. The enamel composition comprises a solids portion and a vehicle. The solids portion includes at least one glass frit and a separate and distinct addition of silicon. The solids portion comprises from about 0.01 weight percent to about 20 weight percent metallic silicon.

16 Claims, No Drawings

ENAMEL FOR USE ON GLASS AND A METHOD OF USING THE SAME

TECHNICAL FIELD

The present invention relates generally to an enamel compositions which may be fired upon a glass substrate. More particularly, the invention concerns a glass enamel composition which contains a separate and distinct addition of silicon (Si) metal.

BACKGROUND

For many years, as discussed in Andrews, U.S. Pat. No. 4,837,383 the automobile industry has manufactured automobiles with back windows which include electrical heating elements to remove frost formed on the window surface. The back windows are printed by a silkscreen printing process with a grid of a metallic material which is then fired on the glass window to form the electrical heating element. In most instances, the grid arrangement forming the heating element is comprised of a bus bar extending along each side of the window, and a series of fine lines extending horizontally across the window, with the fine lines being connected to the bus bars. The grid material from which the heating element is formed typically comprises a mixture containing a silver powder and a small amount of soft lead glass dispersed in a printing vehicle, such as oil, suitable for silkscreen printing. The grid material is applied to the glass substrate in a silk-screen printing process.

Also frequently applied to the back window is a dark grey or black enamel border extending about the periphery, or outer edge, of the back window. The border is printed both for aesthetic reasons, and, also, to protect an adhesive utilized to seal the back window to the car body from degradation due to exposure to ultraviolet light.

In some instances, the bus bars are printed over the enamel border, but, after firing, the bus bars are still visible, and appear from the outside of the automobile, for example, as a dark amber color.

In order to prevent the detection of the bus bars from outside of the automobile some prior art patents disclose altering the composition of the enamel utilized to form the border. In particu-lar, some prior art patents disclose the addition of powdered zinc, tin, cadmium, or manganese to the enamel. Some prior art patents also suggest the addition of powdered metals such as zinc, tin, cadmium or manganese to the enamel, paint or die to facilitate the forming of the glass substrate by helping to prevent the sticking of the forming head or die to the paint or enamel.

More particularly, disclosed in U.S. Pat. Nos. 4,684,388 and 4,684,389 are means to form a glass sheet having an oil base paint fired thereupon wherein the paint contains a fine zinc metal powder. U.S. Pat. No. 4,684,388 further discloses the inclusion of a fine stannous oxide powder in an ultraviolet curable paint which, when applied to the glass sheet, is subject to ultraviolet radiation and heated to a temperature to soften the glass sheet to allow bending thereof. The paint on the glass engages with a fiberglass covering on a forming head or die. The zinc and the stannous oxide powders serve to prevent the sticking of the paint to the fiberglass forming die. U.S. Pat. No. 4,684,389 discloses an oil base paint to which fine zinc powder is added to the paint applied to the glass sheet. The painted glass sheet is then heated to a forming temperature and engaged with a fiberglass covering of a die to form a glass sheet of a desired shape. The metal powder functions to prevent the sticking of the paint to the fiberglass of the forming head or die during the forming process.

Boaz, U.S. Pat. No. 4,596,590 discloses a method of forming a glass sheet with a paint that minimizes sticking. The paint includes a metal oxide powder having at least a low valence oxidation state and a high valence oxidation state, the metal oxide powder being in its low oxidation state when applied. Examples of suitable metal oxide powders include stannous oxide, iron oxide and cuprous oxide.

Stotka, U.S. Pat. No. 4,983,196 also discloses an enamel composition that minimizes sticking. The enamel includes an iron metal powder to help prevent adhesion during the forming operation.

Andrews et al., U.S. Pat. No. 4,975,301 discloses a glass enamel which serves to help hide the bus bars of the heating element. The enamel disclosed by Andrews et al. comprises powdered zinc, tin, cadmium, manganese, iron and mixture and alloys thereof for use in conjunction with a soda-free flux glass.

Andrews, U.S. Pat. No. 4,837,383 also discloses a glass enamel which serves to help hide the bus bars of the heating element. The enamel disclosed by Andrews includes aluminum or lithium oxide.

SUMMARY OF INVENTION

The present invention provides a new and improved glass enamel composition which provides various distinct advantages over many prior art enamel compositions. More particularly, the present invention provides an enamel composition that affords improved opacity and is extremely effective in hiding the bus bars of the heating element of a automobile back window. This enamel composition may also be useful in situations where the glass substrate or section is formed for it may be utilized to reduce the tendency of the enamel to stick to the press head of a glass forming apparatus.

The enamel composition comprises a vehicle and a solids portion. The solids portion may include pigments and fillers. The solids portion includes at least one glass frit and a separate and distinct addition of silicon. The solids portion comprises from about 0.01 weight percent to about 20 weight percent silicon. Preferably the solids portion comprises from about 0.02 weight percent to about 15 weight percent silicon. More preferably, the solids portion comprises from about 0.04 weight percent to about 10 weight percent silicon. Suitable frits for use in connection with the invention include, for example, lead borosilicate frits, zinc borosilicate frits and other lead-containing or lead-free frits whose properties make them useful for the present application.

The invention further provides a method of decorating a glass substrate. The method includes the steps of applying to a glass substrate an enamel composition comprising a vehicle and a solids portion, drying or curing the applied enamel composition and firing the glass substrate bearing of the enamel composition. The enamel composition comprises a vehicle and a solids portion. The solids portion comprises a separate and distinct addition of silicon metal.

The foregoing and other features of the invention are hereinafter more fully described and particularly pointed out in the claims. The following description setting forth in detail certain illustrative embodiments of the invention, these being indicative, however, of but a few of the various ways in which the principles of the invention may be employed.

DETAILED DESCRIPTION

An enamel composition made in accordance with the principles of the present invention, for use in producing a layer of enamel or an enamel finish, band or border upon a section of glass including a vehicle and a solids portion. The solids portion comprises at least one glass frit and a separate and distinct addition of silicon (Si) metal. This addition of silicon is in the metallic nonoxidized state, not in the oxide form such as silicon dioxide ($SiO_2$). It is not known if the silicon remains in the nonoxidized state during firing of the enamel or if it reacts partially or completely with the enamel.

As used herein this specification and the claims below the term "solids portion" means that portion or part of the enamel composition prior to firing exclusive of vehicles or carriers. As used herein this specification and the claims below the term "separate and distinct" means the addition of silicon (Si) metal to the enamel composition through an addition exclusive of any silicon that may be contained in any of the glass frits, pigments or fillers that otherwise make up the enamel composition.

The solids portion comprises from about 0.01 weight percent to about 20 weight percent silicon (Si) metal. Preferably, the solids portion comprises from about 0.02 weight percent to about 15 weight percent silicon (Si) metal. More preferably, the solids portion comprises from about 0.04 weight percent to about 10 weight percent silicon (Si) metal. The solids portion also may include a zinc borosilicate glass frit, a lead borosilicate glass frit or other types of commercially available frits.

To the best of applicants' knowledge the purity of the silicon is not critical. Preferably the silicon is at least 97 percent by weight pure. To the best of applicants' knowledge the particle size of the silicon is not critical. Applicants believe finer sizes (e.g., 10 microns) are effective at levels of 0.05-10 percent or more in enamels containing lead-free frits, and larger sizes (e.g., 20 or 45 microns) may be more effective when used in connection with lead-containing frits, but at somewhat higher concentrations (e.g., 1-15 percent). Applicants believe the practical upper limit on the amount of silicon metal additive depends on the characteristics of the enamel to which it is added and on the requirements of the application. For example, excessive amounts of silicon may increase the firing temperature of the resulting system beyond what is appropriate in a given plant or may impart a coloration that is undesirable for a given application.

The vehicle or carrier which is included in the enamel composition must be one which allows the enamel composition to take the form appropriate for application of the enamel composition to a section of glass such as, for example, a slurry, a paste or a thermoplastic pellet.

The vehicle or carrier preferably comprises a solvent and a resin. Optionally, the vehicle or carrier may also comprise a thixotrope, wetting agents and/or other ingredients to effect the application or printing, drying, curing and/or burnout characteristics of the enamel.

Examples of potential suitable resins include ethyl cellulose, ethyl hydroxy ethyl cellulose, wood rosin, mixtures of ethyl cellulose and phenolic resins, polymethacrylates of lower alcohols and monobutyl ether of ethylene glycol monoacetate.

Examples of potential suitable solvents include terpenes such as alpha- or beta-terpineol or mixtures thereof with other solvents such as kerosene, dibutyl phthalate, butyl carbitol, butyl carbitol acetate, hexylene glycol and high-boiling alcohols and alcohol esters. Various combinations of these and other solvents may be formulated to obtain the desired viscosity and volatility requirements for each application.

Examples of potential suitable thixotropic agents include organic based thixotropics such as, for example, hydrogenated castor oil and derivatives thereof and ethyl cellulose.

Examples of potential suitable wetting agents include fatty acid esters, for example, N-tallow-1,3-diaminopropane di-oleate, N-tallow trimethylene diamine diacetate, N-coco trimethylene diamine, beta diamines, N-oleyl trimethylene diamine, N-tallow trimethylene diamine, and/or N-tallow trimethylene diamine di-oleate.

The enamel composition also may include one or more pigments and one or more fillers. Examples of potential suitable pigments include copper chromite black sold under the trade designation K-384, cobalt aluminate blue sold under the trade designation V-3285, zinc iron chromite brown sold under the trade designation K-100, and iron cobalt chromite black sold under the trade designation F-6340, all sold by the Ferro Corporation of Cleveland, Ohio. A large number of coloring agents of widely varying composition are known to those skilled in the art. The pigment generally accounts for about 5 percent by weight to about 20 percent by weight of the solids portion of the enamel composition.

Examples of potential suitable fillers include alumina ($Al_2O_3$) and silicon dioxide ($SiO_2$). Fillers generally comprise less than about 10 percent, and preferably less than about 5 percent by weight of the enamel composition.

The invention further provides a method of decorating a glass substrate to serve as an electrically heated window that has a conductive metal coating applied thereto as an electrically resistive heating element. The method includes the steps of applying an enamel composition comprising a vehicle and a solids portions, the solids portion comprising a separate and distinct addition of silicon, drying or curing the enamel composition which step is generally only done if the section of glass is to be stored prior to firing, applying the conductive metal coating, drying or curing the applied conductive metal coating and firing the glass substrate. The glass substrate is fired at a temperature of from about 950° F. to about 1,400° F. Preferably, the glass substrate is fired at a temperature of from about 1050° F. to about 1300° F. More preferably, the glass substrate is fired at a temperature of from about 1225° F. to about 1275° F. Once the glass substrate has been heated to temperature it may be subjected to a forming operation.

The enamel composition is typically applied by silk-screening the enamel composition onto the glass substrate and drying the glass enamel composition in an oven to set the enamel and remove all or a portion of the solvent from the vehicle. Then the conductive coating composition is applied by the silk-screen process or other suitable application technique upon the glass substrate abutting or overlapping the dried glass enamel composition. The conductive coating composition may or may not be dried prior to firing. The substrate is then passed through a furnace to fire both coatings to cause them to melt, mature and adhere to the substrate. The glass substrate will typically pass through the furnace in a matter of several minutes (e.g., 3 to 5 minutes) and at a temperature of from about 950° F. (570° C.) to about 1400° F. (760° C.).

Once the glass substrate has been heated to temperature it may be subjected to a forming operation. Such forming operation may be gravity forming or alternatively a press forming apparatus or device may be employed. The press head of the forming device may include a head covered with a refractory fiber material such as FIBERFAX refractory fiber. FIBERFAX is a registered trademark for refractory fiber owned by the Stemcot Corporation of Cleveland, Ohio. Applicants believe that the addition of sufficient quantities of silicon metal will reduce the tendency of the enamel composition to stick to the refractory fiber of the press head.

The following examples will serve to further illustrate the novel features and advantages of the invention. While these examples will show one skilled in the art how to operate within the scope of this invention, they are not to serve as a limitation on the scope of the invention for such scope is only defined by the claims which appear below.

EXAMPLE I

Enamel compositions A, B and C were prepared by combining together in a conventional manner the following components. All percentages shown below are in parts by weight.

| Component | Enamel A | Enamel B | Enamel C |
| --- | --- | --- | --- |
| PF-97 frit[1] | 33.33% | 33.33% | 0 |
| PF-200 frit[2] | 33.33% | 33.33% | 12.25% |
| PF-75 frit[3] | 0 | 0 | 53.00% |
| K-398 CuCr pigment[4] | 16.67% | 15.92% | 16.25% |
| Silicon (Si) metal powder[5] | 0 | .75% | 1.90% |
| C-26 vehicle[6] | 16.67% | 16.67% | 16.60% |
| Total | 100% | 100% | 100% |

[1] Lead borosilicate frit available from the Ferro Corporation of Cleveland, Ohio, under the trade designation PF-97.
[2] Zinc borosilicate frit available from the Ferro Corporation of Cleveland, Ohio under the trade designation PF-200.
[3] Lead borosilicate frit available from the Ferro Corporation of Cleveland, Ohio, under the trade designation PF-75.
[4] CuCr pigment available from the Ferro Corporation of Cleveland, Ohio, under the trade designation K-398.
[5] 10 micron 98.25% pure silicon (Si) metal powder available from Elkem Materials, Inc. of Pittsburgh, Pennsylvania.
[6] C-26 screen printing vehicle is available from the Ferro Corporation of Cleveland, Ohio, under the trade designation C-26.

The frits noted above are available in flake form. Thus, they are ground in a conventional mill to an average particle size of about 4 microns.

Once mixed the enamels are then applied to glass slides and dried in an oven at about 250° F. for 5 minutes so as to substantially remove the vehicle. A stripe of silver paste used to create a bus bar is then applied over each of the enamels. Each of the glass slides is then fired at about 1300° F. for about 3 minutes. Upon cooling the slides are examined in room light by viewing through the glass of the slide. The silver bus bar does not show through the underlying fired enamel and is not visible in room light through enamels B and C. However, the simulated bus bar is clearly visible in room light through enamel A. Enamels B and C also display improved opacity in room light as compared to enamel A.

It will be appreciated that instead of silicon, the invention contemplates the use of germanium (Ge) in the nonoxidized state. Because of the molecular similarity that exists between silicon and germanium, applicants believe it should be possible to substitute the germanium for the silicon and obtain substantially the same results.

Although the invention has been shown and described with respect to certain preferred embodiments, it is obvious that equivalent alterations and modifications will occur to others skilled in the art upon their reading and understanding of the specification. The present invention includes all such equivalent alterations and modifications, and is limited only by the scope of the following claims.

We claim:

1. A method of decorating a glass substrate to serve as an electrically heated window, such electrically heated window having a conductive metal coating applied thereto which serves as an electrically resistive heating element, said method comprising the steps of:
   A. applying to a glass substrate an enamel composition comprising a vehicle and a solids portion, such solids portion comprising a glass frit and a separate and distinct addition of silicon (Si) metal, such solids portion comprising from about 0.01 weight percent to about 20 weight percent silicon metal;
   B. optionally drying or curing such applied enamel composition;
   C. applying a conductive metal coating over such enamel composition;
   D. optionally drying or curing such applied conductive metal coating; and
   E. firing such glass substrate bearing such conductive metal coating and such enamel composition.

2. A method as set forth in claim 1 wherein such glass frit of such solids portion comprises a zinc borosilicate glass frit.

3. A method as set forth in claim 1 wherein during said step E such glass substrate is fired at a temperature of from about 950° F. to about 1400° F.

4. A method as set forth in claim 1 including the step of:
   F. forming such glass substrate bearing such conductive metal coating and enamel composition.

5. A method as set forth in claim 1 wherein during said step E such glass substrate is fired at a temperature of from about 1050° F. to about 1300° F.

6. A method as set forth in claim 1 wherein during said step E such glass substrate is fired at a temperature of from about 1225° F. to about 1275° F.

7. A method as set forth in claim 4 wherein during said step F a press apparatus having a press head including a refractory fiber surface is employed to form such glass substrate.

8. A method as set forth in claim 1 wherein during said step A such enamel composition is applied to such glass substrate using a silk-screening technique.

9. A method as set forth in claim 1 wherein such glass frit of such solids portion comprises a lead borosilicate glass frit.

10. A method as set forth in claim 1 wherein such solids portion comprises about 0.02 weight percent to about 15 weight percent silicon metal.

11. A method as set forth in claim 1 wherein such solids portion comprises about 0.04 weight percent to about 10 weight percent silicon metal.

12. A method as set forth in claim 1 wherein such conductive metal coating comprises a silver paste.

13. A method as set forth in claim 4 wherein during said step F such glass substrate is formed by gravity forming.

14. A method as set forth in claim 1 wherein such glass frit is a glass frit selected from the group of: (i) a zinc borosilicate glass frit; (ii) a lead borosilicate glass frit; (iii) a lead containing glass frit; (iv) a lead-free glass frit and (v) two or more of such (i), (ii), (iii) and (iv).

15. A method as set forth in claim 1 wherein such vehicle comprises an organic printing vehicle.

16. A method as set forth in claim 1 wherein such solids portion includes a pigment.

* * * * *